United States Patent
Chen et al.

(10) Patent No.: US 12,175,787 B2
(45) Date of Patent: Dec. 24, 2024

(54) THREE-DIMENSIONAL HUMAN POSE ESTIMATION METHOD AND RELATED APPARATUS

(71) Applicant: Tencent Technology (Shenzhen) Company Limited, Shenzhen (CN)

(72) Inventors: Weidong Chen, Shenzhen (CN); Wei Zhang, Shenzhen (CN); Di Kang, Shenzhen (CN); Linchao Bao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 341 days.

(21) Appl. No.: 17/901,700

(22) Filed: Sep. 1, 2022

(65) Prior Publication Data
US 2022/0415076 A1    Dec. 29, 2022

Related U.S. Application Data
(63) Continuation of application No. PCT/CN2021/098627, filed on Jun. 7, 2021.

(30) Foreign Application Priority Data
Jul. 27, 2020   (CN) .......................... 202010734364.8

(51) Int. Cl.
G06V 40/10    (2022.01)
(52) U.S. Cl.
CPC .................. G06V 40/103 (2022.01)
(58) Field of Classification Search
CPC .. G06V 40/103; G06V 10/803; G06V 10/806; G06V 10/82; G06V 20/46;
(Continued)

(56) References Cited

U.S. PATENT DOCUMENTS 11,688,139 B1 *   6/2023   Karagoz ............ G09B 19/0038
                                                        345/419
12,094,046 B1 *   9/2024   Sima ....................... G06T 19/00
(Continued)

FOREIGN PATENT DOCUMENTS

CN            107240124 B      10/2017
CN            108491880 A       9/2018
(Continued)

OTHER PUBLICATIONS

K. Zhang, Z. Liu, Y. Li, W. Shi, Y. Chang and Z. Jiang, "Attention-Guided Video Inference for 3D Human posture estimation," 2022 16th ICME International Conference on Complex Medical Engineering (CME), Zhongshan, China, 2022, pp. 182-185, doi: 10.1109/CME55444.2022.10063314. (Year: 2022).*
(Continued)

*Primary Examiner* — Charles T Shedrick
(74) *Attorney, Agent, or Firm* — Morgan, Lewis & Bockius LLP (57) ABSTRACT

This application discloses a three-dimensional human pose estimation method performed by a computer device. An initialization pose estimation result of a single video frame in a video frame sequence of n views is extracted based on a neural network model. Single-frame and single-view human pose estimation is performed on the initialization pose estimation result for each video frame, to obtain n single-view pose estimation sequences respectively corresponding to the n views. Single-frame and multi-view human pose estimation is performed according to single-view pose estimation results with the same timestamp in the n single-view pose estimation sequences, to obtain a multi-view pose estimation sequence. Multi-frame and multi-view human pose estimation is performed on a multi-view pose estimation result in the multi-view pose estimation sequence, to obtain a multi-view and multi-frame pose
(Continued)

estimation result. Therefore, accuracy of human pose estimation is improved.

20 Claims, 5 Drawing Sheets

(58) Field of Classification Search
CPC ...... G06V 10/267; G06V 20/64; G06V 40/10;
G06V 20/41; G06N 3/0464; G06N 3/045;
G06N 3/08; G06N 20/00
See application file for complete search history.

(56) References Cited

U.S. PATENT DOCUMENTS

| | | | |
|---|---|---|---|
| 2018/0186452 | A1 | 7/2018 | Tian et al. |
| 2019/0251341 | A1 | 8/2019 | Nie et al. |
| 2020/0218883 | A1 | 7/2020 | Wang et al. |

FOREIGN PATENT DOCUMENTS

| | | | | |
|---|---|---|---|---|
| CN | 109242950 | A | 1/2019 | |
| CN | 109829972 | A | 5/2019 | |
| CN | 110020611 | A | 7/2019 | |
| CN | 110598590 | A | 12/2019 | |
| CN | 111222486 | A | 6/2020 | |
| CN | 111738220 | A | 10/2020 | |
| CN | 110020611 | B | 12/2020 | |
| EP | 4163882 | A2 * | 4/2023 | ............ G06T 13/40 |
| JP | 2007333690 | A | 12/2007 | |
| JP | 2008140101 | A | 6/2008 | |
| JP | 2014501011 | A | 1/2014 | |
| JP | 2017097577 | A | 6/2017 | |
| JP | 2018129008 | A | 8/2018 | |
| JP | 2019079487 | A | 5/2019 | |
| WO | WO 2004094943 | A1 | 11/2004 | |

OTHER PUBLICATIONS

S. Tao and Z. Zhang, "Video-Based 3D Human Pose Estimation Research," 2022 IEEE 17th Conference on Industrial Electronics and Applications (ICIEA), Chengdu, China, 2022, pp. 485-490, doi: 10.1109/ICIEA54703.2022.10005955. (Year: 2022).*

X. Chu, R. Ji, W. Gao, M. Yan and Z. Zhou, "An Improved Lightweight Human Pose Estimation Method in Video," 2023 China Automation Congress (CAC), Chongqing, China, 2023, pp. 7133-7138, doi: 10.1109/CAC59555.2023.10451146. (Year: 2023).*

Anurag Arnab et al., "Exploiting Temporal Context for 3D Human Pose Estimation in the Wild", 2019 IEEE/CVF Conference on Computer Vision and Pattern Recognition (CVPR), IEEE, Jun. 15, 2019, XP033686788, 10 pgs.

Tencent Technology, Extended European Search Report, EP21849589.3, May 26, 2023, 8 pgs.

Xiu Li et al., "3D Pose Detection of Closely Interactive Humans Using Multi-View Cameras", Sensors, vol. 19, No. 2831, Jun. 25, 2019, XP093047132, 16 pgs.

Tencent Technology (Shenzhen) Company, Japanese Office Action, JP2022-556105, Sep. 12, 2023, 10 pgs.

Yamane et al., "Real-Time Human Motion Recovery from Stereoscopic Image Sequence Using a Human Stick Model", The Institute of Electronics, Information and Communication Engineers, Technical Report of IEICE, vol. 99, No. 710, Mar. 17, 2000, 13 pgs.

Ryuya et al., "Vision-Based Real-Time Human Posture Analysis—Improvement for High Accuracy and Robustness", The Institute of Electrical Engineers of Japan, The Papers of Joint Technical Meeting on Information Processing and Information Oriented Industrial System, Aug. 23, 2002, 9 pgs.

Sato et al., "3D Model-Based Tracking of Human Actions from Multiple Image Sequences", The Information and Systems Society—The Institute of Electronics, Information and Communication Engineers, vol. J80-D-II, No. 6, Jun. 25, 1997, 13 pgs.

Yamazoe et al., "Distributed Camera Calibration Algorithm for Multiple Camera Based Vison Systems and its Application to Human Tracking System", Journal of the Institute of Image Information and Television Engineers, vol. 58, No. 11, 2004, 16 pgs.

Tencent Technology, WO, PCT/CN2021/098627, Sep. 8, 2021, 4 pgs.

Tencent Technology, IPRP, PCT/CN2021/098627, Jan. 31, 2023, 5 pgs.

Satoshi Shimada et al., "Posture Measurement by Camera and Tactile Sensor", Technical Report of IEICE, The Institute of Electronics, Information and Communication of Engineers, vol. 98, No. 527, Jan. 21, 1999, 11 pgs.

Tencent Technology, Japanese Office Action, JP Application No. 2022-556105, Feb. 20, 2024, 12 pgs.

Tencent Technology, ISR, PCT/CN2021/098627, Sep. 8, 2021, 2 pgs.

* cited by examiner

THREE-DIMENSIONAL HUMAN POSE ESTIMATION METHOD AND RELATED APPARATUS

CROSS-REFERENCE TO RELATED APPLICATIONS

This application is a continuation application of PCT Patent Application No. PCT/CN2021/098627, entitled "THREE-DIMENSIONAL HUMAN POSE ESTIMATION METHOD AND RELATED DEVICE" filed on Jun. 7, 2021, which claims priority to Chinese Patent Application No. 202010734364.8, filed with the State Intellectual Property Office of the People's Republic of China on Jul. 27, 2020, and entitled "THREE-DIMENSIONAL HUMAN POSE ESTIMATION METHOD AND APPARATUS, DEVICE, AND MEDIUM", all of which are incorporated herein by reference in their entirety.

FIELD OF THE TECHNOLOGY

Embodiments of this application relate to the field of artificial intelligence, and in particular, to three-dimensional human pose estimation.

BACKGROUND OF THE DISCLOSURE

Three-dimensional human pose estimation is a technology through which a three-dimensional motion made by a human is recognized from a two-dimensional image.

A three-dimensional human pose estimation method is provided in the related art. A two-dimensional image is inputted into a neural network model, and a three-dimensional human pose represented by a three-dimensional model is outputted based on constrained optimization of two-dimensional key points (2D Key points) of the image.

SUMMARY

Embodiments of this application provide a three-dimensional human pose estimation method and apparatus, a device, a medium, and a computer program product, which can provide a multi-frame and multi-view video frame sequence as a two-dimensional clue constraint, to implement stable and accurate three-dimensional human pose estimation for a human. The technical solutions are as follows.

According to an aspect of this application, a three-dimensional human pose estimation method is provided, the method including:

obtaining a video frame sequence of n views, the video frame sequence including a plurality of video frames sorted according to timestamps, and n being an integer greater than 1;

extracting an initialization pose estimation result of a single video frame in the n views based on a neural network model;

performing single-frame and single-view human pose estimation on the initialization pose estimation result, to obtain n single-view pose estimation sequences respectively corresponding to the n views;

performing single-frame and multi-view human pose estimation according to single-view pose estimation results with the same timestamp in the n single-view pose estimation sequences, to obtain a multi-view pose estimation sequence; and performing multi-frame and multi-view human pose estimation on a multi-view pose estimation result in the multi-view pose estimation sequence, to obtain a multi-view and multi-frame pose estimation result.

According to another aspect of this application, a three-dimensional human pose estimation apparatus is provided, the apparatus including:

an obtaining module, configured to obtain a video frame sequence of n views, the video frame sequence including a plurality of video frames sorted according to timestamps, and n being an integer greater than 1;

an initialization module, configured to extract an initialization pose estimation result of a single video frame in the n views based on a neural network model;

a single-view estimation module, configured to perform single-frame and single-view human pose estimation on the initialization pose estimation result, to obtain n single-view pose estimation sequences respectively corresponding to the n views;

a multi-view estimation module, configured to perform single-frame and multi-view human pose estimation according to single-view pose estimation results with the same timestamp in the n single-view pose estimation sequences, to obtain a multi-view pose estimation sequence; and a multi-frame estimation module, configured to perform multi-frame and multi-view human pose estimation on a multi-view pose estimation result in the multi-view pose estimation sequence, to obtain a multi-view and multi-frame pose estimation result.

According to another aspect of this application, a computer device is provided, including a processor and a memory, the memory storing at least one instruction, at least one program, a code set or an instruction set, the at least one instruction, the at least one program, the code set or the instruction set being loaded and executed by the processor to implement the three-dimensional human pose estimation method described in the foregoing aspect.

According to another aspect of this application, a computer-readable storage medium is provided, storing a computer program, the computer program is configured to perform the three-dimensional human pose estimation method according to the foregoing aspect.

According to another aspect of the embodiments of this application, a computer program product including instructions is provided, the computer program product, when run on a computer, causing the computer to perform the three-dimensional human pose estimation method in the foregoing aspect.

The technical solutions provided in the embodiments of this application achieve at least the following beneficial effects:

The initialization pose estimation result extracted from the neural network model is used as a two-dimensional clue constraint, and the multi-frame and multi-view human pose estimation is performed based on an optimized three-dimensional pose estimation method. On one hand, robustness of pose estimation of the neural network model can be utilized. On the other hand, accuracy of the method based on optimization can be utilized. A brand new multi-view and multi-frame human pose estimation method is provided, so that accuracy of human pose estimation is improved, and by using a multi-view constraint and a timing constraint, single-frame and single-view human pose estimation is prevented from easily falling into a local extremum.

BRIEF DESCRIPTION OF THE DRAWINGS

To describe the technical solutions in the embodiments of this application more clearly, the accompanying drawings required for describing the embodiments are briefly described hereinafter. Apparently, the accompanying drawings in the following descriptions show merely some embodiments of this application, and a person of ordinary skill in the art may obtain other accompanying drawings according to these accompanying drawings without creative efforts.

DESCRIPTION OF EMBODIMENTS

To make objectives, technical solutions, and advantages of this application clearer, the following further describes implementations of this application in detail with reference to the accompanying drawings.

Multi-view: A plurality of cameras are used to acquire an action video of a same person from different lines of sight and angles at the same time.

Three-dimensional human pose estimation: A three-dimensional motion made by a human is estimated from a two-dimensional image. Generally, a human joint in human anatomy is used for expressing the three-dimensional motion, or a three-dimensional human parametric model is used for expressing the three-dimensional motion.

Three-dimensional human parametric model: It is referred to as human parametric model for short. A three-dimensional mesh of a human is expressed as some low-dimensional vector sets, and a new human can be expressed as a linear combination of these vector sets. A human parametric model commonly used includes Skinned Multi-Person Linear (SMPL) and Skinned Multi-Person Linear eXpressive (SMPL_X). The SMPL cannot express an expression and gesture of a human, and the SMPL_X extends to express the expression and gesture of the human based on the SMPL.

The SMPL model is a skeleton-driven parametric human model proposed by researchers at Max Planck Institute in Germany. Related articles were published at SIGGRAPH Asia Conference convened by the international Association for Computing Machinery's Special Interest Group on Computer Graphics and Interactive Techniques in 2015. The SMPL model is simple and easy to use, and has been published (only for research) by the author. Therefore, the model has been widely used by researchers.

Based on the SMPL model, the SMPL_X model has 10475 vertices and 54 joints. Joints used for neck, chin, eyeballs and fingers are included in the 54 joints. The SMPL_X is defined by a function M ($\theta$, $\beta$, $\varphi$), where $\theta$ is a pose parameter, $\beta$ is a shape parameter, and $\varphi$ is a facial expression parameter.

An OpenPose model is a human pose recognition model, and is an open source library developed by Carnegie Mellon University (CMU) in the United States based on convolutional neural network and supervised learning. The model can achieve pose estimation of a human motion, a facial expression, a finger motion, and the like, and output a two-dimensional human key point. The OpenPose model is suitable for single person and multiple persons, and has excellent robustness. The OpenPose model is the first real-time multi-person two-dimensional pose estimation application based on deep learning in the world.

The solutions provided in the embodiments of this application relate to three-dimensional human pose estimation technologies in artificial intelligence. In the embodiments of this application, based on the human parametric model SMPL_X, a multi-frame and multi-view video frame sequence is provided as a two-dimensional clue constraint to achieve stable and accurate three-dimensional human pose estimation of a human.

Figure 1:
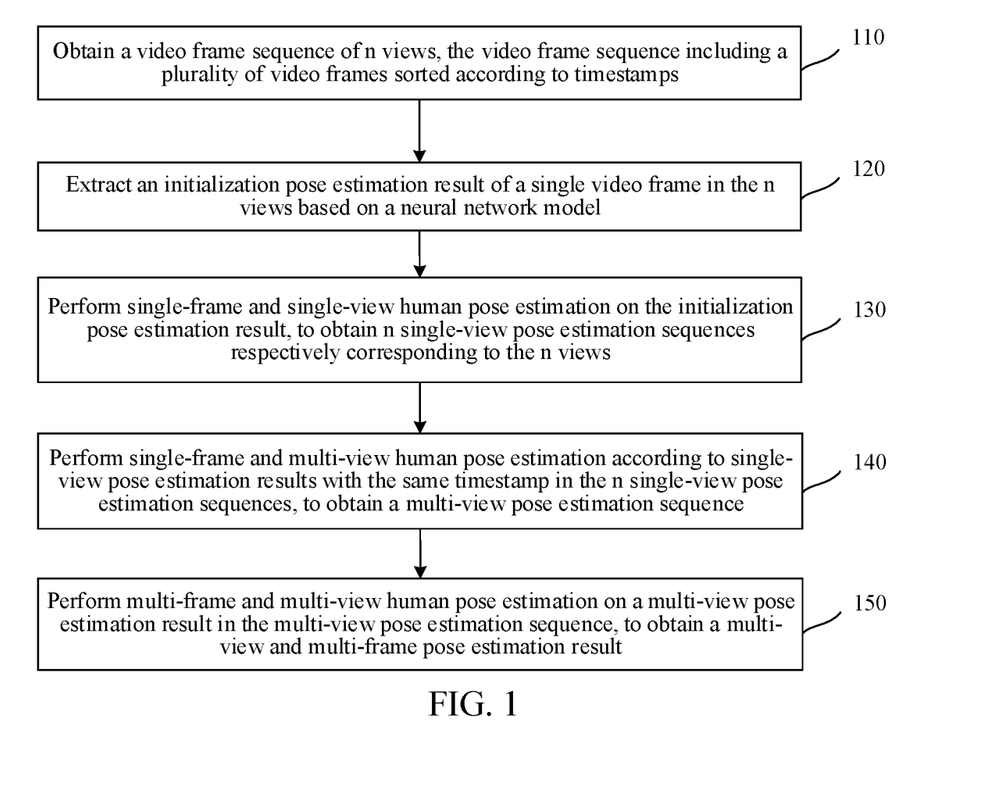
FIG. 1 is a flowchart of a three-dimensional human pose estimation method according to an exemplary embodiment of this application.

FIG. 1 is a flowchart of a three-dimensional human pose estimation method according to an exemplary embodiment of this application. In this embodiment, an example in which the method is applied to a computer device is used for description. The method includes the following steps.

Step 110. Obtain a video frame sequence of n views, the video frame sequence including a plurality of video frames sorted according to timestamps, and n being an integer greater than 1.

The view is an angle formed between a line of sight of a camera and a perpendicular direction of a reference object. For example, if the reference object is a human, the view is the angle formed between the line of sight of the camera and a perpendicular direction in front of the human.

N views are more than two views, and are referred to as multi-view for short. Schematically, any two of the n views are different. In the real world, n cameras are provided to acquire videos of a person according to different views, to obtain video frame sequences of the n views (referred to as videos for short).

Figure 2:
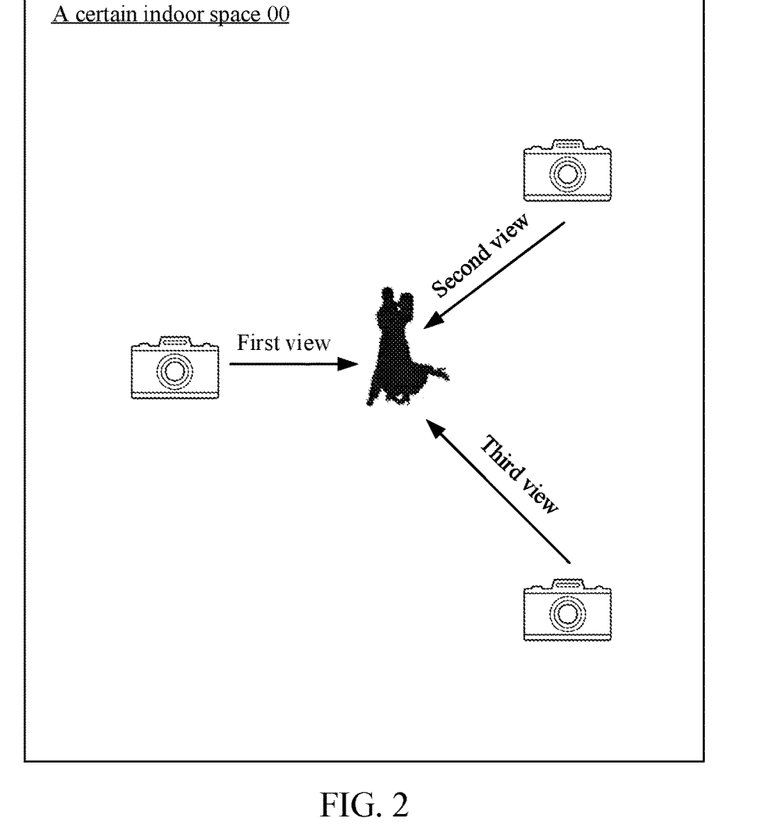
FIG. 2 is a schematic diagram of implementation when an image is acquired in multiple views according to an exemplary embodiment of this application.

Referring to FIG. 2, three cameras are provided in a certain indoor space 00, the first camera acquires a video frame sequence of a person in a first view, the second camera acquires the video frame sequence of the person in a second view, and the third camera acquires the video frame sequence of the person in a third view. The n cameras are cameras without camera calibration.

In some embodiments, numbers of video frames in the video frame sequences of the n views are the same, and frame rates in the video frame sequences of the n views are the same, for example, 60 frames per second. However, it is not excluded that in some embodiments, there are cases that the numbers of video frames in the video frame sequences of the n views are slightly different and the frame rates are different (for example, in multiples or proportions). For a case that the numbers of video frames in the n views are different, video frames in some views may be deleted or discarded, so that the numbers of video frames in the n views are the same. For a case that the frame rates in the n views are different, video frames in some views may also be deleted or discarded in multiples or proportions, so that the numbers of video frames in the n views are the same.

Step 120. Extract an initialization pose estimation result of a single video frame in the n views based on a neural network model.

Schematically, the neural network model is a model with a two-dimensional clue for extracting a single video frame. There are one or more neural network models. Using that the two-dimensional clue includes a two-dimensional human key point, a human segmentation result, and a single-frame human pose estimation result as an example, the neural network model may include: a first model for extracting the two-dimensional human key point, a second model for extracting the human segmentation result, and a third model for extracting the single-frame human pose estimation result. Schematically, the first model is an Openpose model, and the second model is an image semantic segmentation network model or a human parsing network. The third model is a convolutional neural network (CNN). An initialization pose estimation result of each video frame in the n views is extracted at least by the neural network model.

The initialization pose estimation result of each video frame in the n views is extracted based on the neural network model. In an example, initialization pose estimation includes: a two-dimensional human key point in the single video frame, a human segmentation result in the single video frame, and a human pose estimation result in the single video frame.

Using that the n views include three views: a first view, a second view, and a third view as an example, initialization pose estimation results of each single video frame in the first view, the second view, and the third view are respectively extracted.

Step 130. Perform single-frame and single-view human pose estimation on the initialization pose estimation result, to obtain n single-view pose estimation sequences respectively corresponding to the n views.

For each single video frame in the n views, the initialization pose estimation result is used as initialized input, and a constraint of a second clue can be used to perform single-frame and single-view human pose estimation, to obtain a single-view pose estimation result of the video frame.

For each of the n views, because each video frame belonging to a single video frame sequence in the same view corresponds to a single-view human pose estimation result, a single-view pose estimation sequence corresponding to the view can be obtained based on sorting of the corresponding single-view human pose estimation result in the same view.

The single-view pose estimation sequence corresponding to the single-view includes: a plurality of single-view pose estimation results sorted according to an order of the timestamps from front to back. There is a one-to-one correspondence between each single-view pose estimation result and each video frame in the view.

Step 140. Perform single-frame and multi-view human pose estimation according to single-view pose estimation results with the same timestamp in the n single-view pose estimation sequences, to obtain a multi-view pose estimation sequence.

In the n single-view pose estimation sequences respectively corresponding to the n views, there are n single-view pose estimation results belonging to the same timestamp. The same timestamp refers to absolutely the same timestamp, or a timestamp whose time difference is less than a tolerance threshold. For example, when a frame rate is 60 frames per second, two timestamps whose time difference is less than $\frac{1}{60}$ (unit: second) or $\frac{1}{120}$ (unit: second) are considered as the same timestamp.

The single-frame and multi-view human pose estimation is performed on the n single-view pose estimation results with the same timestamp in the n single-view pose estimation sequences, to obtain a multi-view pose estimation result. According to the order of the timestamps from front to back, the single-frame and multi-view human pose estimation is sequentially performed on the n single-view pose estimation results with the same timestamp in the n single-view pose estimation sequences, to obtain a multi-view pose estimation sequence including a plurality of multi-view pose estimation results.

In some embodiments, the multi-view pose estimation sequence includes a plurality of multi-view pose estimation results sorted according to the order of timestamps from front to back, each multi-view pose estimation result has a one-to-one corresponding timestamp, and different multi-view pose estimation results correspond to different timestamps.

Step 150. Perform multi-frame and multi-view human pose estimation on a multi-view pose estimation result in the multi-view pose estimation sequence, to obtain a multi-view and multi-frame pose estimation result.

In some embodiments, the multi-view and multi-frame pose estimation result can be represented by the pose parameter θ in the SMPL_X model.

Figure 3:
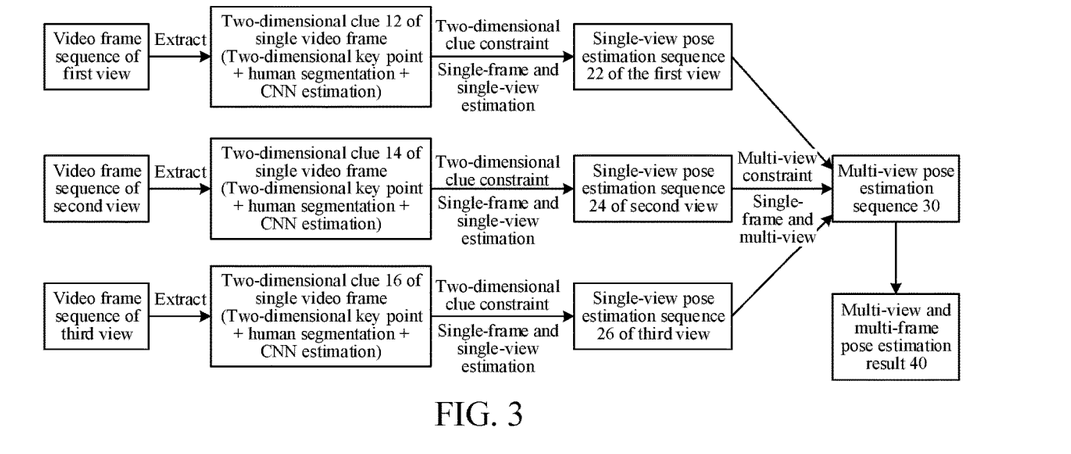
FIG. 3 is a schematic diagram of a framework of a three-dimensional human pose estimation method according to another exemplary embodiment of this application.

Referring to FIG. 3, using that the n views are three views as an example, there are video frame sequences of the first view, the second view, and the third view. Two-dimensional clue extraction is performed on the video frame sequence of the first view, to obtain a two-dimensional clue 12 of each video frame in the first view. The two-dimensional clue extraction is performed on the video frame sequence of the second view, to obtain a two-dimensional clue 14 of each video frame in the second view. The two-dimensional clue extraction is performed on the video frame sequence of the third view, to obtain a two-dimensional clue 16 of each video frame in the third view.

Single-frame and single-view estimation is performed on the two-dimensional clue 12 of each video frame in the first view by using a two-dimensional clue constraint, to obtain a single-view pose estimation sequence 22 of the first view. The single-frame and single-view estimation is performed on the two-dimensional clue 14 of each video frame in the second view by using the two-dimensional clue constraint, to obtain a single-view pose estimation sequence 24 of the second view. The t single-frame and single-view estimation is performed on the two-dimensional clue 16 of each video frame in the third view by using the two-dimensional clue constraint, to obtain a single-view pose estimation sequence 26 of the third view.

In the single-view pose estimation sequence 22 of the first view, the single-view pose estimation sequence 24 of the second view, and the single-view pose estimation sequence 26 of the third view, single-frame and multi-view estimation is performed on single-view pose estimation results with the same timestamp by using a multi-view constraint, to obtain a multi-view pose estimation sequence 30. Multi-frame and multi-view estimation is performed on the multi-view pose estimation sequence 30 by using a timing constraint, to obtain a multi-view and multi-frame pose estimation result 40.

In summary, according to the method provided in this embodiment, the initialization pose estimation result extracted from the neural network model is used as a two-dimensional clue constraint, and the multi-frame and multi-view human pose estimation is performed based on an optimized three-dimensional pose estimation method. On one hand, robustness of pose estimation of the neural network model can be utilized. On the other hand, accuracy of the method based on optimization can be utilized. A brand new multi-view and multi-frame human pose estimation method is provided, so that accuracy of human pose estimation is improved, and by using a multi-view constraint and a timing constraint, single-frame and single-view human pose estimation is prevented from easily falling into a local extremum.

Figure 4:
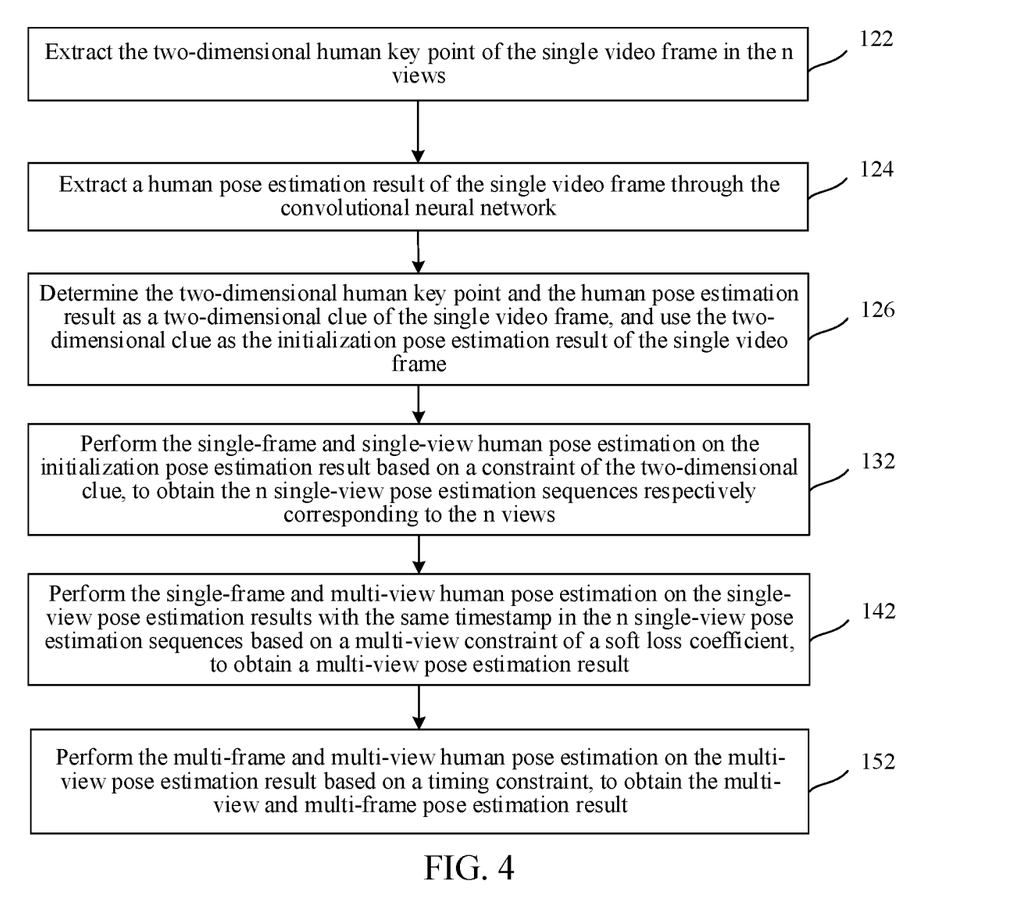
FIG. 4 is a flowchart of a three-dimensional human pose estimation method according to another exemplary embodiment of this application.

For step 120, FIG. 4 shows a flowchart of a pose estimation method of a three-dimensional human according to an exemplary embodiment of this application. In this embodiment, an example in which the method is applied to a computer device is used for description. The method includes the following steps.

Step 122. Extract the two-dimensional human key point of the single video frame in the n views.

The two-dimensional human key point is a human key point located on a two-dimensional image. Schematically, the human key point is represented by a human joint in skeletal anatomy. In an example, the human key point includes but is not limited to: head, neck, shoulder, elbow, hand, hip, knee, or foot. In another example, the human key point further includes a face key point, to recognize a human expression. In another example, the human key point further includes a hand key point, to recognize a gesture action. In this embodiment, the human joint in the skeletal anatomy is used as the human key point.

In an example, this application uses the Openpose model to extract the two-dimensional human key point. The Openpose model is an open source project of Carnegie Mellon University, and includes location of the human joint, the face key point, and the hand key point. The Openpose model can not only output the two-dimensional human key point, but also output a confidence of each two-dimensional human key point. The confidence is used for expressing an accuracy probability of the two-dimensional human key point.

The human segmentation result is used for indicating an image region where a human is located in the two-dimensional image. In some embodiments, this application can also implement human segmentation of one or more humans in an image through a human segmentation network. The human segmentation network performs human segmentation based on an image feature, or a human skeleton feature indicated by the two-dimensional human key point. When there are a plurality of humans in the two-dimensional image, the human segmentation result includes human segmentation results of the plurality of humans. The human segmentation model is an image semantic segmentation network model or a human parsing network.

In some embodiments, a step of determining the human segmentation result is an optional implementation.

Step 124. Extract a human pose estimation result of the single video frame through the convolutional neural network.

In an example, the two-dimensional image is inputted to the CNN, and human pose estimation of the single video frame is extracted by the CNN.

Step 126. Determine the two-dimensional human key point and the human pose estimation result as a two-dimensional clue of the single video frame, and use the two-dimensional clue as the initialization pose estimation result of the single video frame.

In some embodiments, the two-dimensional human key point and the human pose estimation result are determined as the two-dimensional clue and used as the initialization pose estimation result of the single video frame. In some other embodiments, the two-dimensional human key point, the human segmentation result, and the human pose estimation result are determined as the two-dimensional clue and used as the initialization pose estimation result of the single video frame.

In an exemplary implementation, step 130 includes:

Step 132. Perform the single-frame and single-view human pose estimation on the initialization pose estimation result based on a constraint of the two-dimensional clue, to obtain the n single-view pose estimation sequences respectively corresponding to the n views.

The constraint of the two-dimensional clue includes: a distance loss between a third reprojection point and the two-dimensional human key point and a confidence compression coefficient. The third reprojection point is a point reprojected by a three-dimensional human key point in the single-view pose estimation result to an image plane on which the single video frame is located.

The confidence compression coefficient is a compression coefficient acting on a distance between the third reprojection point and the two-dimensional human key point, and the confidence compression coefficient is negatively correlated with confidence of the two-dimensional human key point.

Schematically, for each human indicated by the human segmentation result, based on a constraint of the two-dimensional human key point, the single-frame and single-view human pose estimation is performed on the initialization pose estimation result, to obtain the single-view pose estimation sequences respectively corresponding to the n views.

In some embodiments, the single-frame and single-view human pose estimation is performed on the initialization pose estimation result according to the following formula:

$$E_{Jik} = \sum_{jointj} \gamma(j,k)\omega(\sigma)\omega_j \Big(\prod_k (R_{\theta_i}(J(\beta))_j) - J_{est,ij}\Big);$$

$$J_{est,j} = \begin{cases} \sum_{jframei}(\omega_i * J_{i,j})conf_j >= \xi \\ \text{linear\_interp}(j) \, conf_j < \xi \end{cases};$$

$E_{jik}$ is a loss function of an $i^{th}$ image frame in a $k^{th}$ view, and is used for representing a difference between the estimated human pose estimation result and the two-dimensional clue in the two-dimensional image. K represents a view and i represents the number of frames. $\beta$ is a shape coefficient of a human parametric model, and is used for representing height and weight of a person. $\theta$ is a pose coefficient of the human parametric model, and represents an action of the person, where $\theta_i$ represents a pose coefficient corresponding to the $i^{th}$ image frame. $J_{est,i,j}$ represents a $J^{th}$ two-dimensional human key point estimated from the $i^{th}$ image frame. $J(\beta)$ is a joint regression function of the human parametric model, and is used for returning a position of the joint of the human in a three-dimensional space based on height and weight of the human. $R(\cdot)$ is a rotation function, and is used for rotating a three-dimensional human joint to a correct position through the pose coefficient. $\Pi_k$ is a projection function, and the three-dimensional human joint is projected to a two-dimensional point in an image space according to an estimated camera parameter K. $W_j$ is a distance function, such as a Euclidean space distance or a GMoF distance. $w_\sigma$ is a soft loss coefficient acting on the distance function, and is an increasing function about distance. r (j, k) is a confidence compression function of a $j^{th}$ human key point in the $k^{th}$ view, and is nonlinear transformation.

In an example, r (j, k)=$\text{conf}_{j,k}^2$, $\text{conf}_{j,k}^2$ is a confidence estimated by a two-dimensional human key point detection model (such as the Openpose model) for the $j^{th}$ human key point in the $k^{th}$ view.

In an example, $J_{est,j}$ is the $j^{th}$ human key point in timing after timing smoothing and difference supplementing. Smoothing and interpolation operations are performed on the two-dimensional human key point estimated from the video frame sequence. $\xi$ is a confidence threshold, $\omega_t$ is a weight, $\text{Conf}_i$, is a confidence of the $j^{th}$ human key point, and linear_interp is a linear interpolation function.

In an example, $w_\sigma$, and r (j, k) are optional coefficients.

In an exemplary implementation, step 140 includes:

Step 142. Perform the single-frame and multi-view human pose estimation on the single-view pose estimation results with the same timestamp in the n single-view pose estimation sequences based on a multi-view constraint of a soft loss coefficient, to obtain a multi-view pose estimation result.

The soft loss coefficient is used for identifying tolerance to an existing offset error when the same group of human bones is shared and used through the n views.

In some embodiments, the single-frame and multi-view human pose estimation is performed on the single-view pose estimation results with the same timestamp according to the following formula:

$$E(\beta,\theta_0,\ldots\theta_{n-1})=\Sigma_{framei}(\Sigma_{viewk}(E_{jik}+\lambda E_{pik}));$$

$$E_{jik}=\Sigma_{jointj}\gamma(j,k)\omega(\sigma)\omega_j(\Pi_k(R_{\theta_i}(J(\beta)))_j)-J_{est,i,j});$$

E(·) is a loss function, $E_{jik}$ is a loss function of an $i^{th}$ image frame in a $k^{th}$ view, frame i represents the $i^{th}$ image frame, and view k represents the $k^{th}$ view. $\lambda$ represents a preset constant. $\Sigma$ is a symbol of summation. $E_{pik}$ is a regular term loss of the $i^{th}$ image frame in the $k^{th}$ view, and is used for representing a deviation of an estimated shape coefficient and pose coefficient relative to a mean, to avoid an unreasonable parameter (such as an obese or extremely distorted pose). $E_{Ti}$ is a smoothing term, and is used for representing a difference loss between adjacent frames, to avoid excessive pose jumping between the adjacent frames.

In an example, the initialization pose estimation result includes a two-dimensional human key point in a corresponding single video frame.

The multi-view constraint includes: a distance loss between a first reprojection point of a multi-view pose estimation result corresponding to the single video frame and the two-dimensional human key point. The first reprojection point is a point reprojected by a three-dimensional human key point in the multi-view pose estimation result to an image plane on which the single video frame is located.

The soft loss coefficient $w_\sigma$ is a tolerance coefficient acting on a distance between the first reprojection point and the two-dimensional human key point.

For example, $$w_{\sigma=}w(d;\sigma)=1.0-\frac{1}{\sqrt{2\pi}}e^{\left(\frac{-1*d}{2\sigma}\right)^2}.$$

d is the distance between the first reprojection point and the two-dimensional human key point. $\sigma$ is the tolerance coefficient.

In an exemplary implementation, step 150 includes:

Step 152. Perform the multi-frame and multi-view human pose estimation on the multi-view pose estimation result based on a timing constraint, to obtain the multi-view and multi-frame pose estimation result.

In some embodiments, the multi-frame and multi-view human pose estimation is performed on the multi-view pose estimation result according to the following formula, to obtain the multi-view and multi-frame pose estimation result.

$$E(\beta,\theta_0,\ldots\theta_{n-1})=\Sigma_{framei}(\Sigma_{viewk}(E_{jik}+\lambda E_{pik}))+\Sigma_{framei}(E_{Ti});$$

$$E_{Ti}=\lambda_p\|\theta_i-\theta_{i-1}\|^2+\lambda_M\|M_i-M_{i-1}\|_2^2+\lambda_j\Sigma_{viewk}\|\Pi_k(R_{\theta_i}(J(\beta))-R_{\theta_{i-1}}(J(\beta)))\|^2;$$

$M_i$ is a set of vertex coordinates of a human parametric model according to a certain topological structure under the given shape coefficient and pose coefficient. i−1 represents a previous frame of an frame. $\lambda_p$, $\lambda_m$, and $\lambda_k$ are preset coefficients.

In the foregoing formula $E_{Ti}$, three constraints are introduced to the timing constraint.

First, a constraint $\lambda_p\|\theta_i-\theta_{i-1}\|^2$ is a pose difference loss between multi-view pose estimation results between two adjacent frames, and is used for ensuring that an action difference between the two adjacent frames cannot be excessive.

Second, a constraint $\lambda_M\|M_i-M_{i-1}\|_2^2$ is a vertex difference loss between multi-view pose estimation results between two adjacent frames, and is used for ensuring that human global position difference between the two adjacent frames cannot be excessive. The human global position includes a human orientation and a human translation.

Third, a constraint $\lambda_j\Sigma_{viewk}\|\Pi_k(R_{\theta_i}(J(\beta))-R_{\theta_{i-1}}(J(\beta)))\|^2$ is a difference loss of a second reprojection point of a three-dimensional human joint between multi-view pose estimation results between two adjacent frames, and reduces a wrong pose caused by an estimation error of a two-dimensional human joint.

That is, because the multi-view and multi-frame pose estimation result is represented by the pose parameter in the human parametric model, the human parametric model includes a human mesh formed by a plurality of fixed points. The timing constraint includes: at least one of a pose estimation difference loss between two adjacent frames, a vertex difference loss between two adjacent frames, and a difference loss of a second reprojection point between two adjacent frames, the second reprojection point being a point reprojected by a three-dimensional human key point in the multi-view and multi-frame pose estimation result to an image plane on which the single video frame is located.

In summary, according to the method provided in this embodiment, the two-dimensional human key point, the human segmentation result, and a human pose estimation result predicted by the CNN are determined as the initialization pose estimation result of the single video frame, which can fully utilize robustness of the CNN in two-dimensional human pose estimation, and improve robustness of the pose estimation solution provided in this application in actual application.

On the other hand, in the multi-view and single-frame human pose estimation, a premise to be relied on is that a human in multiple views shares the same human skeleton (including a plurality of human joints), and the same human skeleton is identified by the same shape coefficient in the human parametric model.

However, the inventor finds that the assumption that a set of shape coefficients is shared in the multiple views cannot be well held on the two-dimensional human key point extracted based on the Openpose model, especially because a camera with n views is not calibrated and angled. When imaging conditions such as imaging scale and imaging angle are quite different, the two-dimensional human key point extracted by the Openpose model is seriously deviated. Therefore, in the method provided in this embodiment, the inventor creatively proposes the soft loss coefficient, and the soft loss coefficient allows a certain tolerance distance between the three-dimensional human key point estimated in multiple views and the two-dimensional human key point extracted by the Openpose model, to achieve a better and more accurate human pose estimation result.

In addition, three different timing constraints are introduced to the multi-view and multi-frame human pose estimation. An inter-frame pose estimation difference loss can ensure that a difference between frames cannot be excessive, an inter-frame vertex difference loss can ensure that a difference of a human global position cannot be excessive, and an inter-frame reprojection point difference loss can ensure that a wrong pose caused by an estimation error of the two-dimensional human key point is reduced.

Furthermore, according to the method provided in this embodiment, a coefficient r (j, k) is further introduced, and r (j, k) is a confidence compression function of a $j^{th}$ human key point in a $k^{th}$ view, so that a confidence of a two-dimensional human key point with a low confidence is further compressed. Therefore, an unreliable two-dimensional human key point is suppressed by using nonlinear transformation, to reduce the impact of an error in two-dimensional human key point estimation on a subsequent pose estimation process.

Figure 5:
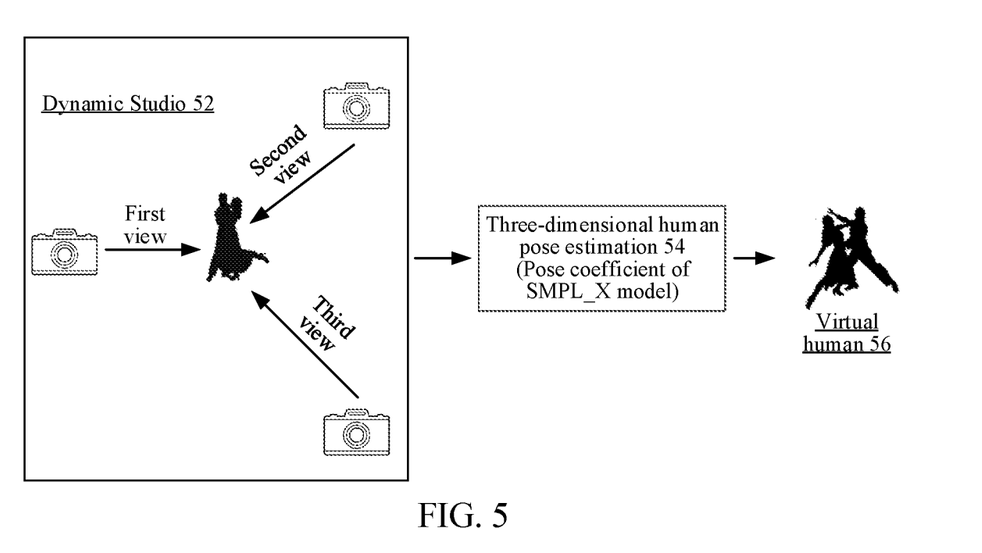
FIG. 5 is a diagram of an application scenario of a three-dimensional human pose estimation method according to an exemplary embodiment of this application.

In an illustrative application example, the three-dimensional human pose estimation method is applied to a virtual human project. A virtual human, also known as an IP virtual human (IVH), is a virtual role generated by voice interaction and virtual formation. During generating of the virtual human, cameras with multiple views are first set up in a dynamic studio, and a real actor performs body performances and expression performances in the dynamic studio. A plurality of video frame sequences of the real actor are acquired by the cameras with the multiple views, a three-dimensional human pose estimation result of the real actor is estimated by the three-dimensional human pose estimation method, and the three-dimensional human pose estimation result is represented by a pose coefficient in a human parametric model SMPL model.

Then, an IP virtual human is constructed according to the SMPL model, and the IP virtual human may be a cartoon image, an animation character, a movie character, a company virtual spokesperson, a virtual news anchor, or the like. Three-dimensional human pose estimation of the real actor estimated in the above process is used to drive the IP virtual human to make body actions and dynamic expressions comparable to a real person.

Figure 6:
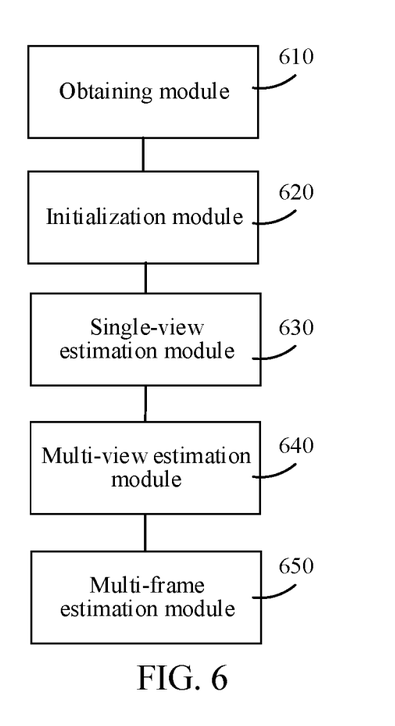
FIG. 6 is a block diagram of a three-dimensional human pose estimation apparatus according to an exemplary embodiment of this application.

FIG. 6 is a block diagram of a three-dimensional human pose estimation apparatus according to an exemplary embodiment of this application. The apparatus includes:

an obtaining module 610, configured to obtain a video frame sequence of n views, the video frame sequence including a plurality of video frames sorted according to timestamps, and n being an integer greater than 1;

an initialization module 620, configured to extract an initialization pose estimation result of a single video frame in the n views based on a neural network model;

a single-view estimation module 630, configured to perform single-frame and single-view human pose estimation on the initialization pose estimation result, to obtain n single-view pose estimation sequences respectively corresponding to the n views;

a multi-view estimation module 640, configured to perform single-frame and multi-view human pose estimation according to single-view pose estimation results with the same timestamp in the n single-view pose estimation sequences, to obtain a multi-view pose estimation sequence; and a multi-frame estimation module 650, configured to perform multi-frame and multi-view human pose estimation on a multi-view pose estimation result in the multi-view pose estimation sequence, to obtain a multi-view and multi-frame pose estimation result.

In an exemplary embodiment, the neural network model includes a convolutional neural network.

The initialization module 620 is configured to extract the two-dimensional human key point of the single video frame in the n views; extract a human pose estimation result of the single video frame through the convolutional neural network; and determine the two-dimensional human key point and the human pose estimation result as a two-dimensional clue of the single video frame, and use the two-dimensional clue as the initialization pose estimation result of the single video frame. In some embodiments, the initialization module 620 is configured to extract the two-dimensional human key point and a human segmentation result of the single video frame in the n views through an Openpose model.

In an exemplary embodiment, the single-view estimation module 630 is configured to perform the single-frame and single-view human pose estimation on the initialization pose estimation result based on a constraint of the two-dimensional clue, to obtain the n single-view pose estimation sequences respectively corresponding to the n views.

In some embodiments, the single-frame and single-view human pose estimation is performed on the initialization pose estimation result according to the following formula:

$$E_{Jik} = \sum\nolimits_{jointj} \gamma(j,k)\omega(\sigma)\omega_j \left( \prod\nolimits_k (R_{\theta_i}(J(\beta))_j) - J_{est,ij} \right);$$

$$J_{est,j} = \begin{cases} \sum\nolimits_{framei} (\omega_i * J_{i,j})conf_j >= \xi \\ \text{linear\_interp}(j)\, conf_j < \xi \end{cases};$$

The constraint of the two-dimensional clue includes: a distance loss between a third reprojection point and the two-dimensional human key point and a confidence compression coefficient. The third reprojection point is a point reprojected by a three-dimensional human key point in the single-view pose estimation result to an image plane on which the single video frame is located.

The confidence compression coefficient is a compression coefficient acting on a distance between the third reprojection point and the two-dimensional human key point, and the confidence compression coefficient is negatively correlated with confidence of the two-dimensional human key point.

In an exemplary embodiment, the multi-view estimation module 640 is configured to perform the single-frame and multi-view human pose estimation on the single-view pose estimation results with the same timestamp in the n single-view pose estimation sequences based on a multi-view constraint of a soft loss coefficient, to obtain a multi-view pose estimation result; and sort the multi-view pose estimation results according to an order of the timestamps from front to back, to obtain the multi-view pose estimation sequence.

The soft loss coefficient is used for identifying tolerance to an existing offset error when the same group of human bones is shared and used through the n views.

In some embodiments, the single-frame and multi-view human pose estimation is performed on the single-view pose estimation results with the same timestamp according to the following formula:

$$E(\beta, \theta_0, \ldots \theta_{n-1}) = \Sigma_{framei}(\Sigma_{viewk}(E_{jik} + \lambda E_{plk}));$$

$$E_{jik} = \Sigma_{jointj} \gamma(j,k) \omega(\sigma) \omega_j (\Pi_k (R_{\theta_i}(J(\beta)))_j) - J_{est,i,j});$$

In an exemplary embodiment, the initialization pose estimation result includes a two-dimensional human key point in a corresponding single video frame. The multi-view constraint includes: a distance loss between a first reprojection point and the two-dimensional human key point. The first reprojection point is a point reprojected by a three-dimensional human key point in the multi-view pose estimation result to an image plane on which the single video frame is located.

The soft loss coefficient is a tolerance coefficient acting on a distance between the first reprojection point and the two-dimensional human key point, and the soft loss coefficient is positively correlated with the distance.

In an exemplary embodiment, the multi-view and multi-frame pose estimation result is represented by a pose parameter in the human parametric model, and the human parametric model includes a human mesh formed by a plurality of fixed points.

The multi-frame estimation module 650 is configured to perform the multi-frame and multi-view human pose estimation on the multi-view pose estimation result based on a timing constraint, to obtain the multi-view and multi-frame pose estimation result.

The timing constraint includes: at least one of a pose estimation difference loss between two adjacent frames, a vertex difference loss between two adjacent frames, and a difference loss of a second reprojection point between two adjacent frames, the second reprojection point being a point reprojected by a three-dimensional human key point in the multi-view and multi-frame pose estimation result to an image plane on which the single video frame is located.

In some embodiments, the multi-frame and multi-view human pose estimation is performed on the multi-view pose estimation result according to the following formula, to obtain the multi-view and multi-frame pose estimation result.

$$E(\beta, \theta_0, \ldots \theta_{n-1}) = \Sigma_{framei}(\Sigma_{viewk}(E_{jik} + \lambda E_{plk})) + \Sigma_{framei}(E_{Ti});$$

$$E_{Ti} = \lambda_p \|\theta_i - \theta_{i-1}\|^2 + \lambda_M \|M_i - M_{i-1}\|_2^2 + \lambda_j \Sigma_{viewk} \|\Pi_k (R_{\theta_i}(J(\beta))) - R_{\theta_{i-1}}(J(\beta)))\|^2;$$

In summary, according to the apparatus provided in this embodiment, the two-dimensional human key point, the human segmentation result, and a human pose estimation result predicted by the CNN are determined as the initialization pose estimation result of the single video frame, which can fully utilize robustness of the CNN in two-dimensional human pose estimation, and improve robustness of the pose estimation solution provided in this application in actual application.

On the other hand, in the multi-view and single-frame human pose estimation, a premise to be relied on is that a human in multiple views shares the same human skeleton (including a plurality of human joints), and the same human skeleton is identified by the same shape coefficient in the human parametric model. However, the inventor finds that the assumption that a set of shape coefficients is shared in the multiple views cannot be well held on the two-dimensional human key point extracted based on the Openpose model, especially because a camera with n views is not calibrated and angled. When imaging conditions such as imaging scale and imaging angle are quite different, the two-dimensional human key point extracted by the Openpose model is seriously deviated. Therefore, in the method provided in this embodiment, the inventor creatively proposes the soft loss coefficient, and the soft loss coefficient allows a certain tolerance distance between the three-dimensional human key point estimated in multiple views and the two-dimensional human key point extracted by the Openpose model, to achieve a better and more accurate human pose estimation result.

In addition, three different timing constraints are introduced to the multi-view and multi-frame human pose estimation. An inter-frame pose estimation difference loss can ensure that a difference between frames cannot be excessive, an inter-frame vertex difference loss can ensure that a difference of a human global position cannot be excessive, and an inter-frame reprojection point difference loss can ensure that a wrong pose caused by an estimation error of the two-dimensional human key point is reduced.

Furthermore, according to the apparatus provided in this embodiment, a coefficient r (j, k) is further introduced, and r (j, k) is a confidence compression function of a $j^{th}$ human key point in a $k^{th}$ view, so that a confidence of a two-dimensional human key point with a low confidence is further compressed. Therefore, an unreliable two-dimensional human key point is suppressed by using nonlinear transformation, to reduce the impact of an error in two-dimensional human key point estimation on a subsequent pose estimation process.

The three-dimensional human pose estimation apparatus provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. In addition, the three-dimensional human pose estimation apparatus provided in the foregoing embodiment and the three-dimensional human pose estimation method embodiments belong to the same concept. For the specific implementation process, refer to the method embodiments, and details are not described herein again.

This application further provides a computer device (a terminal or a server), including a processor and a memory, the memory storing at least one instruction, the at least one instruction being loaded and executed by the processor to implement the three-dimensional human pose estimation method provided in the foregoing method embodiments. The computer device may be a computer device provided in FIG. 7.

Figure 7:
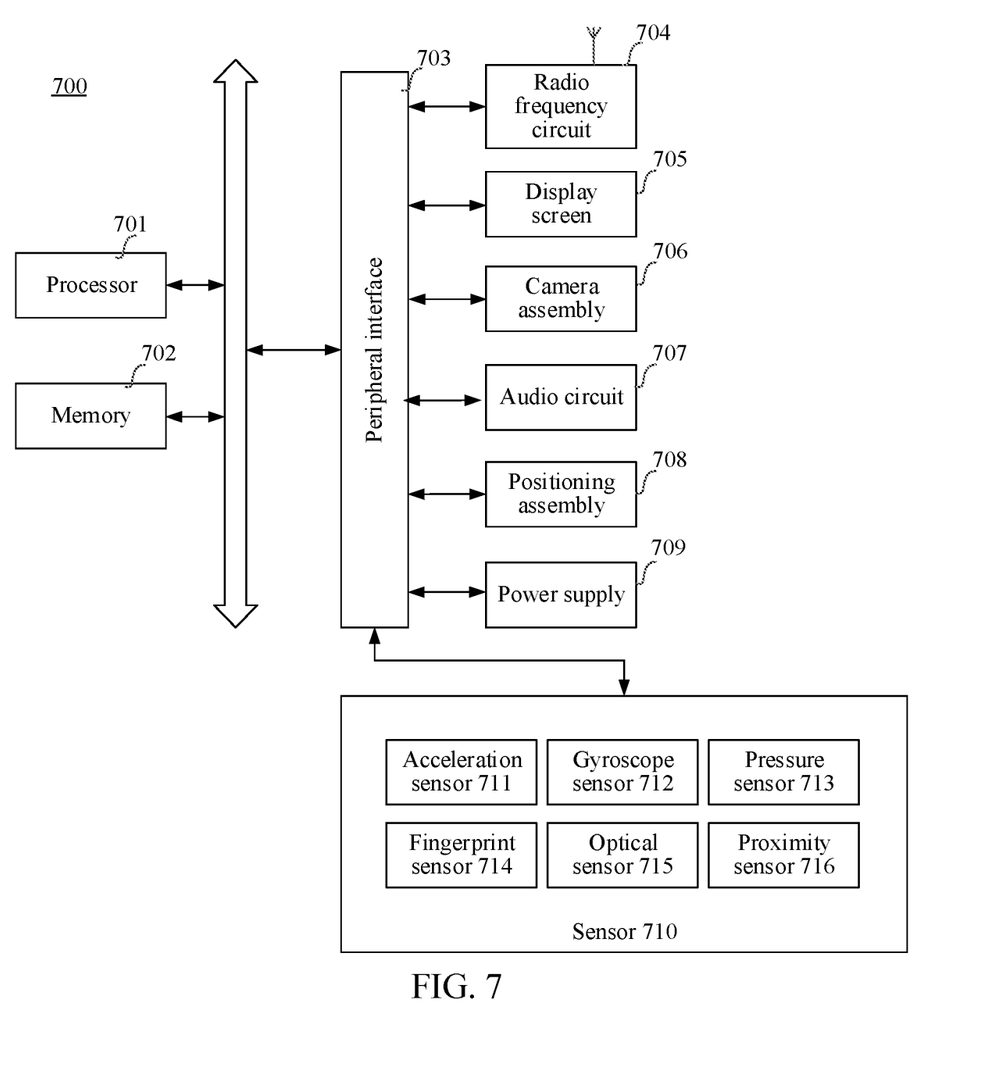
FIG. 7 is a block diagram of a computer device according to an exemplary embodiment of this application.

FIG. 7 is a structural block diagram of a computer device 700 according to an exemplary embodiment of this application. The computer device 700 may be a smartphone, a tablet computer, a Moving Picture Experts Group Audio Layer III (MP3) player, a Moving Picture Experts Group Audio Layer IV (MP4) player, a notebook computer, or a desktop computer. The computer device 700 may also be referred to as other names such as user equipment, a portable computer device, a laptop computer device, or a desktop computer device.

Generally, the computer device 700 includes a processor 701 and a memory 702.

The processor 701 may include one or more processing cores, such as a 4-core processor or an 8-core processor. The processor 701 may be implemented by at least one hardware form in a digital signal processing (DSP), a field-programmable gate array (FPGA), and a programmable logic array (PLA). The processor 701 may also include a main processor and a co-processor. The main processor is a processor for processing data in a wake-up state, also referred to as a central processing unit (CPU). The coprocessor is a low power consumption processor configured to process data in a standby state. In some embodiments, the processor 701 may be integrated with a graphic processing unit (GPU). The GPU is configured to render and plot what needs to be displayed on a display screen. In some embodiments, the processor 701 may also include an AI processor for processing computing operations related to machine learning.

The memory 702 may include one or more computer-readable storage media, which may be non-transitory. The memory 702 may also include a high-speed random access memory, as well as non-volatile memory, such as one or more disk storage devices and flash storage devices. In some embodiments, the non-transitory computer-readable storage medium in the memory 702 is configured to store at least one instruction, and the at least one instruction being configured to be executed by the processor 701 to implement the three-dimensional human pose estimation method provided in the method embodiments of this application.

In some embodiments, the computer device 700 further optionally includes a peripheral interface 703 and at least one peripheral. The processor 701, the memory 702 and the peripheral interface 703 may be connected by a bus or a signal line. Each peripheral may be connected to the peripheral interface 703 by a bus, signal line, or a circuit board. Specifically, the peripheral device includes: at least one of a radio frequency (RF) circuit 704, a touch display screen 705, a camera component 706, an audio circuit 707, a positioning component 708, and a power supply 709.

In some embodiments, the computer device 700 further includes one or more sensors 710. The one or more sensors 710 include, but are not limited to: an acceleration sensor 711, a gyroscope sensor 712, a pressure sensor 713, a fingerprint sensor 714, an optical sensor 715, and a proximity sensor 716.

A person skilled in the art may understand that the structure shown in FIG. 7 does not constitute any limitation on the computer device 700, and the computer device may include more components or fewer components than those shown in the figure, or some components may be combined, or a different component deployment may be used.

The memory further includes one or more programs, where the one or more programs are stored in the memory, and the one or more programs include instructions used for performing the three-dimensional human pose estimation method provided in the embodiments of the present invention.

This application provides a computer-readable storage medium, storing a computer program, the computer program being configured to perform the three-dimensional human pose estimation method provided in the foregoing embodiments.

This application further provides a computer program product, the computer program product, when run on a computer, causing the computer to perform the three-dimensional human pose estimation method according to the foregoing embodiments.

The sequence numbers of the foregoing embodiments of this application are merely for description purpose, and are not intended to indicate the preference among the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments of this application, but are not intended to limit this application. Any modification, equivalent replacement, or improvement made within the spirit and principle of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A three-dimensional human pose estimation method, performed by a computer device, the method comprising:
    obtaining a video frame sequence of n views, the video frame sequence comprising a plurality of video frames sorted according to their timestamps, and n being an integer greater than 1;
    extracting an initialization pose estimation result of each single video frame in the n views based on a neural network model;
    performing single-frame and single-view human pose estimation on the initialization pose estimation result for each single video frame, to obtain n single-view pose estimation sequences respectively corresponding to the n views;
    performing single-frame and multi-view human pose estimation according to single-view pose estimation results with the same timestamp in the n single-view pose estimation sequences, to obtain a multi-view pose estimation sequence; and
    performing multi-frame and multi-view human pose estimation on each multi-view pose estimation result in the multi-view pose estimation sequence, to obtain a multi-view and multi-frame pose estimation result.

2. The method according to claim 1, wherein the performing single-frame and multi-view human pose estimation according to single-view pose estimation results with the same timestamp in the n single-view pose estimation sequences, to obtain a multi-view pose estimation sequence comprises:
    performing the single-frame and multi-view human pose estimation on the single-view pose estimation results with the same timestamp in the n single-view pose estimation sequences based on a multi-view constraint of a soft loss coefficient, to obtain a multi-view pose estimation result; and
    sorting the multi-view pose estimation results according to an order of the timestamps from front to back, to obtain the multi-view pose estimation sequence, the soft loss coefficient being used for identifying tolerance to an existing offset error when the same group of human bones is shared and used through the n views.

3. The method according to claim 2, wherein the initialization pose estimation result comprises a two-dimensional human key point in a corresponding single video frame; and the multi-view constraint comprises: a distance loss between a first reprojection point and the two-dimensional human key point, the first reprojection point being a point reprojected by a three-dimensional human key point in the multi-view pose estimation result to an image plane on which the single video frame is located; and the soft loss coefficient being a tolerance coefficient acting on a distance between the first reprojection point and the two-dimensional human key point, and the soft loss coefficient being positively correlated with the distance.

4. The method according to claim 1, wherein the multi-view and multi-frame pose estimation result is represented by a pose parameter in a human parametric model, and the human parametric model comprises a human mesh formed by a plurality of fixed points; and the performing multi-frame and multi-view human pose estimation on a multi-view pose estimation result in the multi-view pose estimation sequence, to obtain a multi-view and multi-frame pose estimation result comprises:

performing the multi-frame and multi-view human pose estimation on the multi-view pose estimation result based on a timing constraint, to obtain the multi-view and multi-frame pose estimation result, the timing constraint comprising: at least one of a pose estimation difference loss between two adjacent frames, a vertex difference loss between two adjacent frames, and a difference loss of a second reprojection point between two adjacent frames, the second reprojection point being a point reprojected by a three-dimensional human key point in the multi-view and multi-frame pose estimation result to an image plane on which the single video frame is located.

5. The method according to claim 4, further comprising:

generating, according to the human parametric model, a virtual human corresponding to a human identified by the video frame sequence through the pose parameter used for representing the multi-view and multi-frame pose estimation result.

6. The method according to claim 1, wherein the neural network model comprises a convolutional neural network, and the extracting an initialization pose estimation result of a single video frame in the n views based on a neural network model comprises:

extracting the two-dimensional human key point of the single video frame in the n views;

extracting a human pose estimation result of the single video frame through the convolutional neural network; and determining the two-dimensional human key point and the human pose estimation result as a two-dimensional clue of the single video frame, and using the two-dimensional clue as the initialization pose estimation result of the single video frame.

7. The method according to claim 6, wherein the neural network model further comprises a first model for extracting the two-dimensional human key point and a second model for extracting a human segmentation result, and the extracting the two-dimensional human key point of the single video frame in the n views comprises:

extracting the two-dimensional human key point of the single video frame in the n views through the first model; and the method further comprises:

extracting a human segmentation result of the single video frame in the n views through the second model.

8. The method according to claim 7, wherein the determining the two-dimensional human key point and the human pose estimation result as a two-dimensional clue of the single video frame, and using the two-dimensional clue as the initialization pose estimation result of the single video frame comprises:

determining the two-dimensional human key point, the human segmentation result, and the human pose estimation result as the two-dimensional clue of the single video frame, and using the two-dimensional clue as the initialization pose estimation result of the single video frame.

9. The method according to claim 6, wherein the performing single-frame and single-view human pose estimation on the initialization pose estimation result, to obtain n single-view pose estimation sequences respectively corresponding to the n views comprises:

performing the single-frame and single-view human pose estimation on the initialization pose estimation result based on a constraint of the two-dimensional clue, to obtain the n single-view pose estimation sequences respectively corresponding to the n views, the constraint of the two-dimensional clue comprising: a distance loss between a third reprojection point and the two-dimensional human key point and a confidence compression coefficient; the third reprojection point being a point reprojected by a three-dimensional human key point in the single-view pose estimation result to an image plane on which the single video frame is located; and the confidence compression coefficient being a compression coefficient acting on a distance between the third reprojection point and the two-dimensional human key point, and the confidence compression coefficient being negatively correlated with confidence of the two-dimensional human key point.

10. A computer device, comprising a processor and a memory, the memory storing at least one instruction, the at least one instruction being loaded and executed by the processor to cause the computer device to implement a three-dimensional human pose estimation method including:

obtaining a video frame sequence of n views, the video frame sequence comprising a plurality of video frames sorted according to their timestamps, and n being an integer greater than 1;

extracting an initialization pose estimation result of each single video frame in the n views based on a neural network model;

performing single-frame and single-view human pose estimation on the initialization pose estimation result for each single video frame, to obtain n single-view pose estimation sequences respectively corresponding to the n views;

performing single-frame and multi-view human pose estimation according to single-view pose estimation results with the same timestamp in the n single-view pose estimation sequences, to obtain a multi-view pose estimation sequence; and performing multi-frame and multi-view human pose estimation on each multi-view pose estimation result in the multi-view pose estimation sequence, to obtain a multi-view and multi-frame pose estimation result.

11. The computer device according to claim 10, wherein the performing single-frame and multi-view human pose estimation according to single-view pose estimation results with the same timestamp in the n single-view pose estimation sequences, to obtain a multi-view pose estimation sequence comprises:

performing the single-frame and multi-view human pose estimation on the single-view pose estimation results with the same timestamp in the n single-view pose estimation sequences based on a multi-view constraint of a soft loss coefficient, to obtain a multi-view pose estimation result; and sorting the multi-view pose estimation results according to an order of the timestamps from front to back, to obtain the multi-view pose estimation sequence, the soft loss coefficient being used for identifying tolerance to an existing offset error when the same group of human bones is shared and used through the n views.

12. The computer device according to claim 11, wherein the initialization pose estimation result comprises a two-dimensional human key point in a corresponding single video frame; and the multi-view constraint comprises: a distance loss between a first reprojection point and the two-dimensional human key point, the first reprojection point being a point reprojected by a three-dimensional human key point in the multi-view pose estimation result to an image plane on which the single video frame is located; and the soft loss coefficient being a tolerance coefficient acting on a distance between the first reprojection point and the two-dimensional human key point, and the soft loss coefficient being positively correlated with the distance.

13. The computer device according to claim 10, wherein the multi-view and multi-frame pose estimation result is represented by a pose parameter in a human parametric model, and the human parametric model comprises a human mesh formed by a plurality of fixed points; and the performing multi-frame and multi-view human pose estimation on a multi-view pose estimation result in the multi-view pose estimation sequence, to obtain a multi-view and multi-frame pose estimation result comprises:

performing the multi-frame and multi-view human pose estimation on the multi-view pose estimation result based on a timing constraint, to obtain the multi-view and multi-frame pose estimation result, the timing constraint comprising: at least one of a pose estimation difference loss between two adjacent frames, a vertex difference loss between two adjacent frames, and a difference loss of a second reprojection point between two adjacent frames, the second reprojection point being a point reprojected by a three-dimensional human key point in the multi-view and multi-frame pose estimation result to an image plane on which the single video frame is located.

14. The computer device according to claim 10, wherein the neural network model comprises a convolutional neural network, and the extracting an initialization pose estimation result of a single video frame in the n views based on a neural network model comprises:

extracting the two-dimensional human key point of the single video frame in the n views;

extracting a human pose estimation result of the single video frame through the convolutional neural network; and determining the two-dimensional human key point and the human pose estimation result as a two-dimensional clue of the single video frame, and using the two-dimensional clue as the initialization pose estimation result of the single video frame.

15. The computer device according to claim 14, wherein the neural network model further comprises a first model for extracting the two-dimensional human key point and a second model for extracting a human segmentation result, and the extracting the two-dimensional human key point of the single video frame in the n views comprises:

extracting the two-dimensional human key point of the single video frame in the n views through the first model; and the method further comprises:

extracting a human segmentation result of the single video frame in the n views through the second model.

16. A non-transitory computer-readable storage medium, storing a computer program, the computer program being configured to perform a three-dimensional human pose estimation method including:

obtaining a video frame sequence of n views, the video frame sequence comprising a plurality of video frames sorted according to their timestamps, and n being an integer greater than 1;

extracting an initialization pose estimation result of each single video frame in the n views based on a neural network model;

performing single-frame and single-view human pose estimation on the initialization pose estimation result for each single video frame, to obtain n single-view pose estimation sequences respectively corresponding to the n views;

performing single-frame and multi-view human pose estimation according to single-view pose estimation results with the same timestamp in the n single-view pose estimation sequences, to obtain a multi-view pose estimation sequence; and performing multi-frame and multi-view human pose estimation on each multi-view pose estimation result in the multi-view pose estimation sequence, to obtain a multi-view and multi-frame pose estimation result.

17. The non-transitory computer-readable storage medium according to claim 16, wherein the performing single-frame and multi-view human pose estimation according to single-view pose estimation results with the same timestamp in the n single-view pose estimation sequences, to obtain a multi-view pose estimation sequence comprises:

performing the single-frame and multi-view human pose estimation on the single-view pose estimation results with the same timestamp in the n single-view pose estimation sequences based on a multi-view constraint of a soft loss coefficient, to obtain a multi-view pose estimation result; and sorting the multi-view pose estimation results according to an order of the timestamps from front to back, to obtain the multi-view pose estimation sequence, the soft loss coefficient being used for identifying tolerance to an existing offset error when the same group of human bones is shared and used through the n views.

18. The non-transitory computer-readable storage medium according to claim 17, wherein the initialization pose estimation result comprises a two-dimensional human key point in a corresponding single video frame; and the multi-view constraint comprises: a distance loss between a first reprojection point and the two-dimensional human key point, the first reprojection point being a point reprojected by a three-dimensional human key point in the multi-view pose estimation result to an image plane on which the single video frame is located; and the soft loss coefficient being a tolerance coefficient acting on a distance between the first reprojection point and the two-dimensional human key point, and the soft loss coefficient being positively correlated with the distance.

19. The non-transitory computer-readable storage medium according to claim 16, wherein the multi-view and multi-frame pose estimation result is represented by a pose parameter in a human parametric model, and the human parametric model comprises a human mesh formed by a plurality of fixed points; and the performing multi-frame and multi-view human pose estimation on a multi-view pose estimation result in the multi-view pose estimation sequence, to obtain a multi-view and multi-frame pose estimation result comprises:

performing the multi-frame and multi-view human pose estimation on the multi-view pose estimation result based on a timing constraint, to obtain the multi-view and multi-frame pose estimation result, the timing constraint comprising: at least one of a pose estimation difference loss between two adjacent frames, a vertex difference loss between two adjacent frames, and a difference loss of a second reprojection point between two adjacent frames, the second reprojection point being a point reprojected by a three-dimensional human key point in the multi-view and multi-frame pose estimation result to an image plane on which the single video frame is located.

20. The non-transitory computer-readable storage medium according to claim 16, wherein the neural network model comprises a convolutional neural network, and the extracting an initialization pose estimation result of a single video frame in the n views based on a neural network model comprises:

extracting the two-dimensional human key point of the single video frame in the n views;

extracting a human pose estimation result of the single video frame through the convolutional neural network; and determining the two-dimensional human key point and the human pose estimation result as a two-dimensional clue of the single video frame, and using the two-dimensional clue as the initialization pose estimation result of the single video frame.

* * * * *